US011498999B2

(12) United States Patent
Bai et al.

(10) Patent No.: US 11,498,999 B2
(45) Date of Patent: Nov. 15, 2022

(54) AQUEOUS POLYURETHANE DISPERSION ADHESIVE COMPOSITIONS

(71) Applicants: DOW GLOBAL TECHNOLOGIES LLC, Midland, MI (US); ROHM AND HAAS COMPANY, Philadelphia, PA (US)

(72) Inventors: Chenyan Bai, Shanghai (CN); Zhaohui Qu, Shanghai (CN); Jie Wu, Lake Jackson, TX (US); Kalyan Sehanobish, Sanford, MI (US); Hongyu Chen, Shanghai (CN); Xinchun Liu, Shanghai (CN); Chao Zhang, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 408 days.

(21) Appl. No.: 16/612,535

(22) PCT Filed: May 11, 2017

(86) PCT No.: PCT/CN2017/083935
§ 371 (c)(1),
(2) Date: Nov. 11, 2019

(87) PCT Pub. No.: WO2018/205221
PCT Pub. Date: Nov. 15, 2018

(65) Prior Publication Data
US 2020/0207903 A1 Jul. 2, 2020

(51) Int. Cl.
C08G 18/10 (2006.01)
B32B 7/12 (2006.01)
C08G 18/28 (2006.01)
C08G 18/32 (2006.01)
C08G 18/73 (2006.01)
C08G 18/75 (2006.01)
(Continued)

(52) U.S. Cl.
CPC ............. C08G 18/10 (2013.01); B32B 7/08 (2013.01); B32B 7/12 (2013.01); B32B 27/08 (2013.01); B32B 27/306 (2013.01); B32B 27/308 (2013.01); B32B 27/32 (2013.01); B32B 27/34 (2013.01); B32B 27/36 (2013.01); B32B 27/365 (2013.01); C08G 18/0866 (2013.01); C08G 18/12 (2013.01); C08G 18/283 (2013.01); C08G 18/3206 (2013.01); C08G 18/3228 (2013.01); C08G 18/4018 (2013.01); C08G 18/4808 (2013.01); C08G 18/4825 (2013.01); C08G 18/4833 (2013.01); C08G 18/4854 (2013.01); C08G 18/73 (2013.01); C08G 18/757 (2013.01); C08G 18/7657 (2013.01); C08G 18/7671 (2013.01); C09J 175/06 (2013.01); C09J 175/08 (2013.01); B32B 2250/02 (2013.01); B32B 2250/242 (2013.01); B32B 2250/244 (2013.01); B32B 2255/10 (2013.01); B32B 2255/205 (2013.01); B32B 2270/00 (2013.01); B32B 2307/724 (2013.01); B32B 2405/00 (2013.01); C08L 2201/54 (2013.01); C09J 2203/00 (2013.01)

(58) Field of Classification Search
CPC .. B32B 7/12; B32B 7/08; B32B 27/08; B32B 27/34; B32B 27/306; B32B 27/308; B32B 27/32; B32B 27/36; B32B 27/365; B32B 2250/02; B32B 2250/242; B32B 2255/10; B32B 2255/205; B32B 2250/244; B32B 2270/00; B32B 2307/724; B32B 2405/00; C08G 18/283; C08G 18/3206; C08G 18/3228; C08G 18/73; C08G 18/757; C08G 18/7657; C08G 18/4018; C08G 18/7671; C08G 18/12; C08G 18/4808; C08G 18/4825; C08G 18/4833; C08G 18/4854; C08G 18/10; C08G 18/0866; C08L 2201/54; C08J 175/06; C08J 175/08; C08J 2203/00
See application file for complete search history.

(56) References Cited

U.S. PATENT DOCUMENTS 6,589,384 B2  7/2003  Chen et al.
8,716,402 B2  5/2014  Temple et al.
(Continued)

FOREIGN PATENT DOCUMENTS

WO      0043433 A1      7/2000
WO   WO 2015/081486  *  6/2015

OTHER PUBLICATIONS

PCT/CN2017/083935, International Search Report and Written Opinion dated Feb. 13, 2018.
(Continued)

Primary Examiner — Patrick D Niland

(57) ABSTRACT

An aqueous polyurethane dispersion compositions are disclosed. The compositions include a polyurethane prepolymer dispersed in an aqueous medium, the polyurethane prepolymer comprising an isocyanate and a crystalline polyester polyol having a hydroxyl content of 20 to 150 mg KOH/g and a melt temperature of less than or equal to 90° C. Methods of forming a laminate are also disclosed. The methods include providing an aqueous polyurethane dispersion, applying the polyurethane dispersion to a surface of the first substrate, bringing the side of the first substrate into contract with a surface of the second substrate, and curing the aqueous dispersion, thereby laminating the first substrate to the second substrate. Laminates formed by the methods and including the compositions are also disclosed.

5 Claims, 2 Drawing Sheets

(51) Int. Cl.
*C08G 18/76* (2006.01)
*C09J 175/06* (2006.01)
*C09J 175/08* (2006.01)
*B32B 7/08* (2019.01)
*B32B 27/08* (2006.01)
*C08G 18/08* (2006.01)
*B32B 27/34* (2006.01)
*C08G 18/40* (2006.01)
*B32B 27/30* (2006.01)
*B32B 27/32* (2006.01)
*B32B 27/36* (2006.01)
*C08G 18/12* (2006.01)
*C08G 18/48* (2006.01)

(56) References Cited

U.S. PATENT DOCUMENTS

| | | |
|---|---|---|
| 9,200,179 B2 | 12/2015 | Uchida |
| 2003/0050347 A1* | 3/2003 | Faust ............... C08L 75/04 516/38 |
| 2003/0105219 A1* | 6/2003 | Schutze ............. C08G 18/6692 524/589 |
| 2005/0228096 A1 | 10/2005 | Kirsten et al. |
| 2005/0256261 A1* | 11/2005 | Arndt ................. C09J 175/04 524/591 |
| 2006/0269758 A1 | 11/2006 | Helmeke |
| 2009/0253858 A1 | 10/2009 | Argyropoulos et al. |
| 2010/0104831 A1 | 4/2010 | Kanagawa et al. |
| 2014/0235786 A1* | 8/2014 | Goto .................. C08G 18/4837 524/591 |
| 2016/0230046 A1 | 8/2016 | Vinci et al. |

OTHER PUBLICATIONS

PCT/CN2017/083935, International Preliminary Report on Patentability dated Nov. 12, 2019.

* cited by examiner

AQUEOUS POLYURETHANE DISPERSION ADHESIVE COMPOSITIONS

FIELD OF THE DISCLOSURE

The instant disclosure relates to aqueous polyurethane dispersion adhesive compositions and methods for forming laminates comprising same. More particularly, the disclosure relates to aqueous polyurethane dispersion (alternatively referred to herein as "PUD") adhesive compositions for use in laminate films, the compositions having improved barrier properties.

BACKGROUND AND SUMMARY OF THE DISCLOSURE

Polymeric materials, particularly polymeric films, are widely used for packaging purposes. These materials are used extensive application in the food and drug industries. In these and other uses, exposure of the packaged product to oxygen and/or other gases may be highly undesirable, where such exposure results in degradation of the product over time. Unfortunately, many polymeric films are inherently relatively permeable to oxygen. One approach to enhancing oxygen and/or other gas barrier properties that has been investigated has been to use multiple layers of such polymeric materials, with the layers bonded together with an adhesive to form laminates. Additional approaches have included the use of adhesives comprising barrier properties themselves to further enhance oxygen and/or other gas barrier properties.

Adhesives used in laminating applications, or "laminating adhesives," can be generally placed into three categories: solvent-based, water-based (or "aqueous"), and solventless. Adhesive performance and associated concerns vary by category and by the application in which the adhesive is applied. Unfortunately, in some of these formulations either the solvent itself or the adhesive remaining after solvent removal may represent workplace and/or environmental hazards. Furthermore, for solvent-based adhesives, solvent removal represents additional energy expenditure. Typical alternatives for providing barrier laminates include polyvinylidine chloride ("PVDC"), which presents carcinogen concerns (e.g., chlorine-containing products) and ethylene vinyl alcohol copolymer ("EVOH"), typically used as a co-extrusion film or cast film. EVOH has a relatively high melting temperature, i.e., greater than 150° C. At such high melting temperature, most polymeric films would also melt; thus EVOH cannot be applied as a solventless adhesive. While EVOH has excellent barrier properties with respect to oxygen and other gases, it has poor moisture barrier properties. Still further, EVOH is relatively expensive.

Other barrier adhesive approaches have used crystalline phase or inorganic nanoparticles to improve barrier performance. The inorganic nanoparticles must be homogeneously dispersed into the adhesive system and have the risk of settling or phase separation. The current practice of crystalline phase technology mainly uses solvent-based crystalline polyester polyol as the main backbone, which has solvent concern discussed above and generally is not aligned with the trend of switching from solvent-based to water-based or solventless adhesives.

Accordingly, laminating adhesives exhibiting good barrier properties that are safe and provide efficiencies for converters are desirable.

The instant disclosure relates to aqueous polyurethane dispersion adhesive compositions. The compositions include a polyurethane prepolymer comprising an isocyanate and a crystalline polyester polyol having a hydroxyl value of 20 to 150 mg KOH/g and a melt temperature of less than or equal to 90° C., and water. In some embodiments, the crystalline polyester polyol is a polycondensate of a linear diol, polycondensate of a linear dicarboxylic acid, a polycaprolactone, or a combination thereof.

The instant disclosure further relates to methods for laminating a first substrate to a second substrate. The methods include providing an aqueous polyurethane dispersion composition, including a polyurethane prepolymer comprising an isocyanate and a crystalline polyester polyol having a hydroxyl value of 20 to 150 mg KOH/g and a melt temperature of less than or equal to 90° C., and water. The methods further include applying the aqueous polyurethane dispersion composition to a surface of the first substrate and bringing the side of the first substrate into contract with a surface of the second substrate. The methods still further include curing the aqueous polyurethane dispersion composition, thereby laminating the first substrate to the second substrate.

The instant disclosure still further relates to laminates formed including the disclosed compositions and formed by the disclosed methods.

The instant disclosure provides for aqueous polyurethane dispersion compositions that impart improved oxygen and/or other gas barrier properties to laminate structures. The improved barrier performance may be ascribed, at least in part, to the fact that the adhesive compositions form crystalline polyester domains after reaction of the isocyanate and the crystalline polyester polyol, but prior to substantial completion of cure, and then maintains the crystalline polyester domains following cure.

BRIEF DESCRIPTION OF THE DRAWINGS

Reference is made to the accompanying drawings in which.

DETAILED DESCRIPTION OF THE DISCLOSURE

Figure 1:
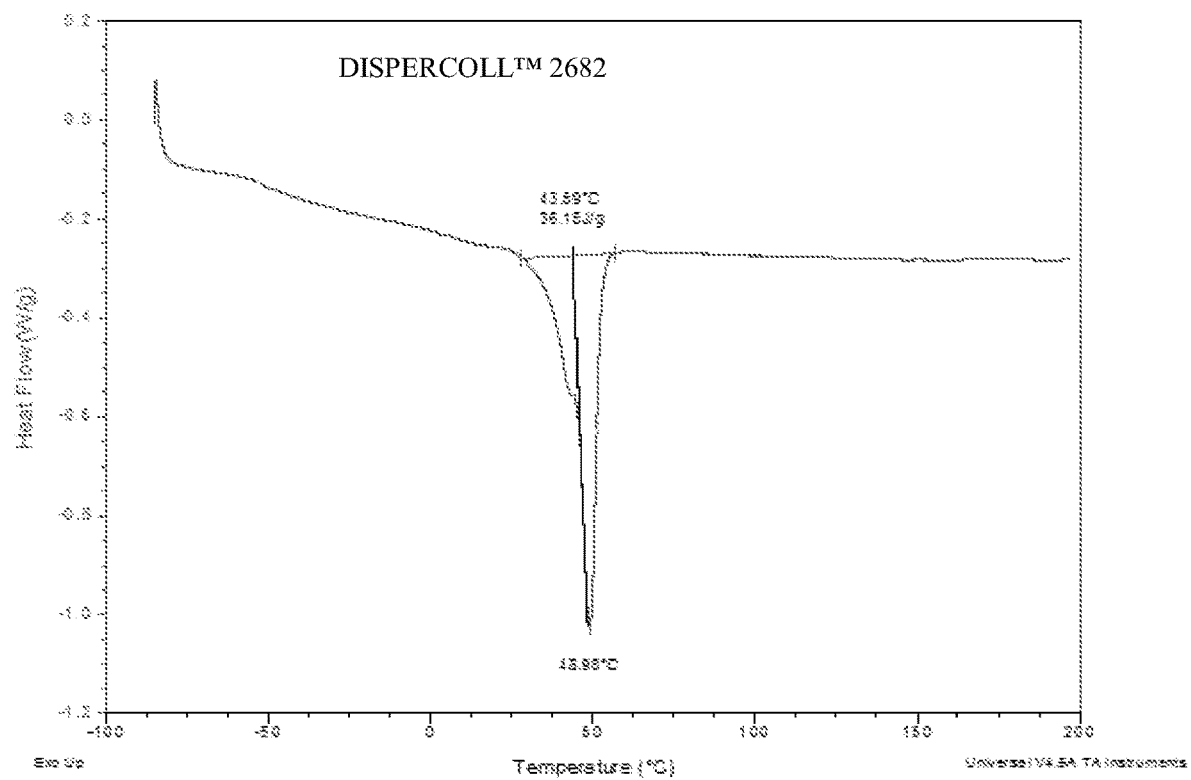
FIG. 1 is a differential scanning calorimetry curve for DISPERCOLL™ U XP 2682.

The aqueous polyurethane dispersion compositions disclosed throughout are water-based or "aqueous." As used herein, a composition is said to be "aqueous" if the composition is liquid at 25° C. and contains 30% or more water by weight based on the weight of the composition. A water-based composition contains a continuous fluid medium in which discreet droplets or particles may optionally be suspended. The continuous fluid medium contains water in the amount, by weight based on the weight of the continuous fluid medium, of 50% or higher, or 60% or higher, or 70% or higher. The continuous fluid medium is herein called an aqueous medium. Compounds other than water that are contained in aqueous compositions are said herein to be distributed through the aqueous medium. Such compounds may be dissolved, dispersed, or a combination thereof. Dispersed compounds exist as discreet droplets or particles; such particles may contain two or more substances. Compounds that are dissolved in the aqueous medium are distributed as individual molecules.

Polyurethane Prepolymer

A urethane is a compound that contains a urethane linkage, which has the structure

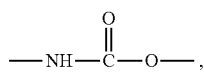

in which both of the open bonds are connected to carbon atoms. A polyurethane is a compound that contains three or more urethane linkages per molecule.

In some embodiments, the polyurethane prepolymers of the aqueous polyurethane dispersion compositions comprise an isocyanate and a crystalline polyester polyol having a hydroxyl value of 20 to 150 mg KOH/g and a melt temperature of less than or equal to 90° C.

Polyurethane Prepolymer: Isocyanate

An isocyanate is a compound that contains one or more pendant isocyanate group —NCO (e.g., an isocyanate that contains more than one isocyanate group per molecule is a polyisocyanate, an isocyanate that contains exactly two isocyanate groups is a diisocyanate, etc.). Unless specified otherwise, the term isocyanate as used herein includes monomeric isocyanates and polyisocyanates. In some embodiments, the isocyanate is a diisocyanate.

The isocyanate can be selected from the group consisting of aromatic polyisocyanates, aliphatic polyisocyanates, cycloaliphatic polyisocyanates, and combinations of two or more thereof. An "aromatic polyisocyanate" is a polyisocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Suitable aromatic polyisocyanates include, but are not limited to, 2,4'-diphenylmethane diisocyanate (2,4'-MDI), 4,4'-diphenylmethane diisocyanate, 1,3- and 1,4-phenylene diisocyanate, 1,5-naphthylene diisocyanate, 2,6-tolulene diisocyanate, 2,4-tolulene diisocyanate (2,4-TDI), 3,3'-Dimethyl-4,4'-Biphenyldiisocyanate (TODI), polymeric isocyanates, and mixtures of two or more thereof. In some embodiments, the isocyanate is an aromatic diisocyanate, such as isomers of MDI. In some embodiments, the isocyanate includes isomers of 2,4'-MDI and 4,4'-MDI in a ratio of 45:55, based on the weight of each isomer.

Suitable aliphatic polyisocyanates have 3 to 16 carbon atoms, or 4 to 12 carbon atoms, in the linear or branched alkylene residue. Suitable cycloaliphatic polyisocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate and diisocyanatodicyclohexylmethane (H12MDI). Examples of aliphatic and cycloaliphatic polyisocyantes include hexamethylene diisocyanate (HDI), cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, isophorone diisocyanate (IPDI), diisocyanatodicyclohexylmethane (H12MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), xylylene diisocyanate (XDI), tetramethylxylylene diisocyanate, and dimers, trimers, and mixtures of the of two or more thereof. In some embodiments, the isocyanate is an aliphatic diisocyanate, such as HDI.

Additional isocyanate-containing compounds suitable for use according to this disclosure include 4-methyl-cyclohexane 1,3-diisocyanate, 2-butyl-2-ethylpentamethylene diisocyanate, 3 (4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and mixtures of the of two or more thereof.

In some embodiments, the total amount of isocyanate is, by weight based on the total weight of the polyurethane prepolymer, 8 wt % or more, or 12 wt % or more. In some embodiments, the total amount of isocyanate is, by weight based on the total weight of the polyurethane prepolymer, 40 wt % or less, or 30 wt % or less. In some embodiments, the total amount of isocyanate is, by weight based on the total weight of the polyurethane prepolymer, is from 8 to 40 wt %, or from 12 to 30 wt %.

Commercially available examples of isocyanates suitable for use according to the present disclosure include, but are not limited to DESMODUR™ 2460M, DESMODUR™ H, and DESMODUR™ I available from Covestro AG and ISONATE™ 50 O,P' And ISONATE™ 125M available from The Dow Chemical Company.

Polyurethane Prepolymer: Polyester Polyol

A polyol is a compound having two or more hydroxyl groups (i.e., —OH) per molecule. A diol has exactly two —OH groups per molecule. A difunctional polyol is a diol. An ester is a compound that contains an ester linkage, which has the structure:

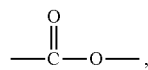

in which both of the open bonds are connected to carbon atoms. A polyester is a compound that contains three or more ester linkages per molecule. A compound that is both a polyester and a polyol is a polyester polyol. An aliphatic polyester polyol is a polyester polyol that contains no aromatic ring in its molecule. An aromatic polyester polyol is a polyester polyol that contains one or more aromatic rings in its molecule.

In some embodiments, the polyester polyol is a crystalline polyester polyol having a hydroxyl value of from 20 to 150 KOH/g, or from 30 to 100 KOH/g, as measured according to ASTM E 222-10. In some embodiments, the polyester polyol has a melt temperature of 90° C. or less, or 80° C. or less, or 70° C. or less. In some embodiments, polyester polyol has a melt temperature greater than 25° C., or greater than 30° C. In some embodiments, the polyester polyol is a polycondensate of a linear diol and a linear carboxylic acid. In some embodiments, the polyester polyol is in crystalline form at ambient temperature. The melt temperature of the crystalline polyester polyol can be measured according to ASTM D3418-15 (Standard Test Method for Transition Temperatures and Enthalpies of Fusion and Crystallization of Polymers by Differential Scanning Calorimetry)

In some embodiments, the linear diol is selected from the group consisting of ethylene glycol, butylene glycol, diethylene glycol, triethylene glycol, polyalkylene glycols such as polyethylene glycol, 1,2-propanediol, 1,3-propanediol, 1,3-butanediol, 1,4-butanediol, 1,6-hexanediol, neopentyl glycol, and combinations of two or more thereof. In some embodiments, the linear diol is a diol having 3 to 6 carbon atoms, for example, 1,4-butanediol and/or 1,6-hexanediol.

Dicarboxylic acids are the mixtures of aromatic acid and aliphatic acid. Suitable examples of the aromatic acids are phthalic acid, isophthalic acid, and terephthalic acid; while suitable examples of the aliphatic acids are adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, and 2,2-dimethyl succinic acid. Anhydrides of these acids can likewise be used. Preferably, the aliphatic acids and aromatic acids are saturated, and are respectively adipic acid and isophthalic acid. Monocarboxylic acids, such as benzoic acid and hexane carboxylic acid, should be minimized or excluded. In some embodiments, the linear carboxylic acid is adipic acid. Other suitable acids for forming the polyester polyol include azelaic acid and sebacic acid.

In some embodiments, the polyester polyol is a polycaprolactone polyol having crystalline behavior.

In some embodiments, the polyester polyol has a weight-average molecular weight of 400 g/mol or higher, or 800 g/mol or higher. In some embodiments, the polyester polyol has a number-average molecular weight of 5,000 g/mol or lower, or 4,000 g/mol or lower. In some embodiments, polyester polyol contains one or more aliphatic polyester polyols. In some embodiments, polyester polyol contains one or more aliphatic polyester polyols and contains no aromatic polyester polyols.

In some embodiments, the total amount of polyester polyol is, by weight based on the total weight of the polyurethane prepolymer, 30 wt % or more, or 50 wt % or more. In some embodiments, the total amount of polyester polyol is, by weight based on the total weight of the polyurethane prepolymer, 80 wt % or less, or 70 wt % or less. In some embodiments, the total amount of polyester polyol is, by weight based on the total weight of the polyurethane prepolymer, is from 30 to 80 wt %, or from 50 to 70 wt %.

Commercially available examples of polyester polyols suitable for use according to this disclosure include, but are not limited to, BESTER™ 121 available from The Dow Chemical Company or CAPA™ 2302 available from Perstorp.

Polyurethane Prepolymer: Other

In some embodiments, the polyurethane prepolymer further includes a polyether polyol. In some embodiments, the polyether polyol includes a hydrophilic side chain.

In some embodiments, the polyurethane prepolymer further includes a polyamine. In some embodiments, the polyamines is a diamine, in which each amine group is a primary or a secondary amine. Suitable examples of the diamines include, but are not limited to, ethylene diamine, 1,2- and 1,3-diaminopropane, 1,4-diaminobutane, 1,6-diaminohexane, isophorone diamine, and combinations of two or more thereof Polyurethane Dispersion Compositions In some embodiments, the aqueous polyurethane dispersion compositions optionally include other ingredients such as fillers, extenders, UV absorbers, light stabilizers, plasticizers, and wetting agents. These optional ingredients, if used, may comprise up to 10 wt % of the total weight of the isocyanate and the polyester polyol.

In some embodiments, the aqueous polyurethane dispersion compositions include one or more anionic surfactants.

Anionic surfactants are compounds the molecules of which have a hydrophobic portion and a portion that is anionic. In some embodiments, the anionic surfactants contain a hydrophobic group that has 6 or more carbon atoms, or 8 or more carbon atoms, or 10 or more carbon atoms. Hydrophobic groups may be linear, branched, cyclic aliphatic, aromatic, or a combination thereof. In some embodiments, the hydrophobic group is a linear alkyl group attached to an aromatic ring. In some embodiments, the anionic groups are acid and salt forms of carboxyl groups, sulfate groups, and sulfonate groups.

In some embodiments, the amount of anionic surfactant in the aqueous polyurethane dispersion composition is, by weight based on the total weight of the isocyanate and polyester polyol, 0.5 wt % or more, or 0.8 wt % or more, or 2 wt % or more. In some embodiments, the amount of anionic surfactant in the aqueous polyurethane dispersion composition is, by weight based on the total weight of the isocyanate and polyester polyol, 10 wt % or less, or 8 wt % or less, or 5 wt % or less.

In some embodiments, isocyanate crosslinker can be added to the aqueous polyurethane dispersions. In some embodiments, the isocyanate crosslinker is added after the polyurethane particles are dispersed in the aqueous medium. In some embodiments, the isocyanate crosslinker has two or more isocyanate groups per molecule. In some embodiments, the isocyanate crosslinker has three or more isocyanate groups per molecule. In some embodiments, the isocyanate crosslinkers are trimers of monomeric diisocyanates.

In some embodiments, the monomeric diisocyanates for use in making the isocyanate crosslinker are monomeric aliphatic diisocyanates. Suitable examples of the monomeric aliphatic diisocyanates include, but are not limited to, 1,6-hexamethylene diisocyanate ("HDI"), 1-isocyanato-3-isocyanatomethyl-3,5,5-trimethyl-cyclohexane ("IPDI"), 4,4'-diisocyanato dicyclohexylmethane (H12MDI), di-isocyanatomethyl-cyclohexane ("ADI"), and any combination thereof. The monomeric aromatic diisocyanates described above may be optionally used in the preparation of the polyisocyanate crosslinker.

The isocyanate crosslinker can be added to the polyurethane dispersions under stirring to prepare the aqueous polyurethane adhesive composition of the present disclosure.

The aqueous polyurethane dispersion compositions described above may be made according to any method. One particular method is described below.

The isocyanate and polyester polyol are mixed and heated to make a polyurethane prepolymer. Preferably, the polyurethane prepolymer is isocyanate-functional (i.e., is isocyanate-terminated). The resulting mixture is then mixed with an aqueous solution of an anionic surfactant under high-speed agitation. Then additional water is added under high-speed agitation, and a dispersion forms in which the continuous phase is aqueous and the dispersed particles contain polyurethane prepolymer. A polyamine, when it is used, is then added slowly under high-speed agitation. When polyamine reacts with isocyanate groups on the polyurethane prepolymer, the resulting polymer is referred to as a polyurea-polyurethane. When organic solvent is used in making the polyurethane, the organic solvent is preferably removed from the adhesive composition prior to use.

Laminates

In some embodiments, the disclosed polyurethane dispersion compositions can be used as adhesives in laminate applications. To use the compositions as laminating adhesive, the composition can be mixed with one or more isocyanate crosslinkers to form a water-based adhesive composition.

A layer of water-based adhesive composition can be applied to a surface of a first substrate. In some embodiments, the layer of waterborne adhesive composition is dried or allowed to dry to form a layer of dried adhesive composition. Drying may be accomplished by any method, including, for example, one or more of passage of time, applying heat, and exposing to moving air. The layer of adhesive composition is considered to be dried when the amount of water remaining in the layer of adhesive composition is 10% or less by weight, based on the weight of water that was applied as part of the waterborne adhesive composition.

The dried layer of adhesive composition on the first substrate can be brought into contact with the surface of a second substrate. In some embodiments, the first and/or second substrates are organic polymers, such as polyolefins, polyolefin copolymers, polycarbonates, polyesters, and polyamides. Polyolefins are homopolymers and copolymers of olefin monomers, which are hydrocarbon molecules containing one or more carbon-carbon double bond. Polyolefin copolymers are copolymers of one or more olefin monomer with one or more vinyl acetate, acrylate monomers, and methacrylate monomers. In some embodiments, the polymers are polyethylene, polyethylene terephthalate, and/or nylon. In some embodiments, the first and/or second substrates are metalized films. In some embodiments, the first and second substrates can be any combination of the example substrates described above.

After the substrates are brought together, the composite article thus formed is known as a laminate. The laminate can be subjected to mechanical force to press the first and second substrates towards each other. Such mechanical force is preferably applied by passing the laminate between rollers.

In some embodiments, the composite article comprising the first and second substrates is part of a larger composite article that contains further substrates. The further layers may contain one or more substrates described above and/or one or more layers of adhesive compositions. Any substrates and/or adhesive compositions present in the further layers may be the identical to or different from each other and from the polymer film, adhesive composition present in the above-described composite article.

EXAMPLES OF THE DISCLOSURE

The present disclosure will now be explained in further detail by Illustrative Examples and Comparative Examples (collectively, "the Examples"). However, the scope of the present disclosure is not, of course, limited to the formulations set forth in the examples. Rather, the Examples are merely illustrative of the disclosure.

Some of the raw materials used to prepare the Examples are identified in Table 1 below by name and commercial supplier.

TABLE 1

Raw Material Information for Adhesives

| Grade/Commercial Name | Description | Commercial Supplier |
| --- | --- | --- |
| ROBOND ™ L168 | Non-crystalline, water-based acrylic latex | The Dow Chemical Company |
| PUD-2 | Non-crystalline polyurethane dispersion | |
| PUD-1 | Crystalline polyurethane dispersion having melt temperature of approximately 45° C. | |
| DISPERCOLL ™ U XP 2682 | Anionic polyurethane dispersion having melt temperature of approximately 49° C. | Covestro |
| CAPA ™ 2302 | Linear polyester polyol derived from caprolactone monomer, having an average molecular weight of 3,000 g/mol | Perstorp |
| ISONATE ™ 50 O, P' | Aromatic isocyanate composed of approximately 50 wt % 2,4-MDI and 50 wt % 4,4'-MDI, having a NCO content of 33.5 wt % | The Dow Chemical Company |
| CARBOWAX ™ 1000 | Polyethylene glycol having average molecular weight from 950 to 1,050 and hydroxyl number from 107 to 118 mg KOH/g | The Dow Chemical Company |
| VORANOL ™ V 9287A | Polypropylene glycol, having an average molecular weight of 2000 g/mol | The Dow Chemical Company |
| CARBOWAX ™ MPEG 1000 | Methoxy polyethylene glycol, having an average molecular weight of 1000 g/mol | The Dow Chemical Company |
| TETRATHANE ™ 2000 | Polytetramethylene ether glycol, having an average molecular weight of 2000 g/mol | Invista |
| YMER ™ N120 | Linear difunctional polyethylene glycol monomethyl ether with long alkoxy side chain, having average molecular weight of approximately 1,000 | Perstop |
| Dipropylene glycol | Dipropylene glycol, chemically pure grade | TCI Chemicals |
| RHODACAL ™ DS-4 | Sodium dodecylbenzene sulfonate surfactant, having 23% solids content | Solvay |
| 1,2-propane diamine | Chain extender, chemically pure grade | TCI Chemicals |
| CR-3A | HDI trimer-based crosslinker | The Dow Chemical Company |

PUD-1

27.9 grams ISONATE™ 50 O,P' is added to a mixture of 107.2 grams CAPA™ 2302, 12 grams CARBOWAX™ 1000, 3.8 grams dipropylene glycol, and 5 g YMER™ N120. The mixture is reacted at 65 to 90° C. for 4 to 5 hours until a theoretical NCO content is reached, thereby forming a polyurethane prepolymer. The polyurethane prepolymer can be transferred into a container in which 19.8 grams of RHODACAL™ DS-4 can be introduced and mixed under high speed (2,000 to 3,000 rpm) for 1 to 3 minutes. 330 grams of deionized water (~5° C.) is then added under high speed mixing to make sure the homogeneous dispersion is achieved. Next, 3.4 grams of a 1,2-propane diamine and water solution (20%) into the dispersion slowly, and mixing is held at 1,000 to 1,500 rpm for 15 to 30 minutes. An aqueous polyurethane dispersion with a solids content of 31.6%, a pH of 6.4, and an average particle size of 175 nm is formed. The aqueous dispersion proved to be stable, having no sediment at room temperature (i.e., 20 to 25° C.) for two months.

PUD-2

44.7 grams ISONATE™ 50 O,P' is added to a mixture of 102.5 grams VORANOL™ V 9287A, 89.7 grams TET-RATHANE™ 2000, 6.2 grams CARBOWAX™ 1000, and 5.1 grams CARBOWAX™ MPEG 1000. The mixture is reacted at 65 to 90° C. for 4 to 5 hours until a theoretical NCO content is reached, thereby forming a polyurethane prepolymer. The polyurethane prepolymer can be transferred into a container in which 31.6 grams of RHODA-CAL™ DS-4 can be introduced and mixed under high speed (2,000 to 3,000 rpm) for 1 to 3 minutes. 360 grams of deionized water (~5° C.) is then added under high speed mixing to make sure the homogeneous dispersion is achieved. Next, 8.2 grams of a 1,2-propane diamine and water solution (20%) is added into the dispersion slowly, and mixing is held at 1,000 to 1,500 rpm for 15 to 30 minutes. An aqueous polyurethane dispersion with a solids content of 40% and a pH of 6.4 is formed. The aqueous dispersion proved to be stable, having no sediment at room temperature (i.e., 20 to 25° C.) for two months.

Adhesive Formulation

The above-mentioned PUD or acrylic emulsion are mixed with 2% of crosslinker CR3A under 1,000 rpm stirring for 10 minutes to make the adhesive formulation.

Lamination Preparation

Laminates are prepared on a LABO-COMBI™ 400 machine from Nordmeccanica comprising biaxially oriented polypropylene ("BOPP") and cast polypropylene ("CPP") films with a coating weight of 2.0 to 2.3 grams adhesive per square meter. The laminates are cured at room temperature (i.e., 20 to 25° C.) for 7 days.

Gas Transmission Property Tests

The oxygen gas transmission rate of the laminate structures is measured according to ASTM D3985 (Standard Test Method for Oxygen Gas Transmission Rate through a Plastic Film and Sheeting Using a Coulometric Sensor). The conditions used for this testing are 23° C. and 85% relative humidity. The water vapor transmission rate of the laminate structures is measured according to ASTM Method F-1249. The conditions used for this testing are 37.8° C. and 90% relative humidity.

TABLE 2

Performance Results

| Example | Laminate BOPP/ adhesive/CPP | OTR cc/ [m$^2$-day] | WVTR gm/ [m$^2$-day] | Bond strength (N/15 mm) |
|---|---|---|---|---|
| CE1 | BOPP/PUD-2/CPP | 1707 | 3.85 | 0.7 |
| CE2 | BOPP/ ROBOND ™ L168/CPP | 1692 | 3.898 | 0.5 |
| IE1 | BOPP/ DISPERCOLL ™ U XP 2682/CPP | 927 | 3.84 | 0.6 |
| IE2 | BOPP/PUD-1/CPP | 992 | 3.97 | 0.8 |

Figure 2:
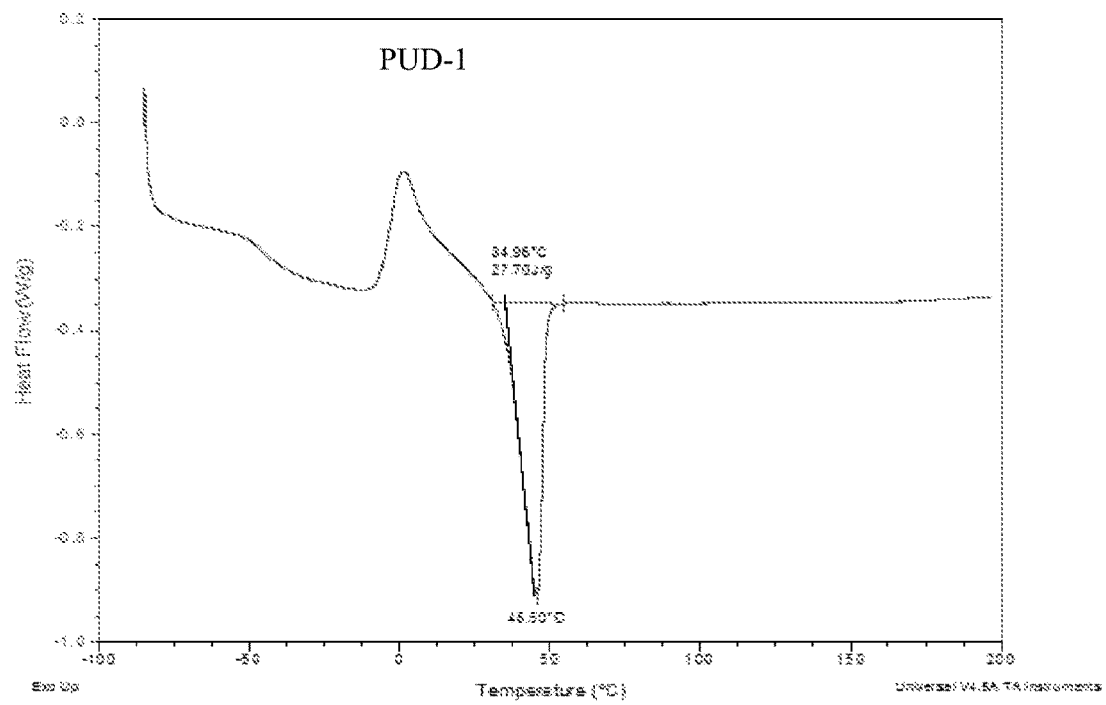
FIG. 2 is a differential scanning calorimetry curve for PUD-1.
Figure 3:
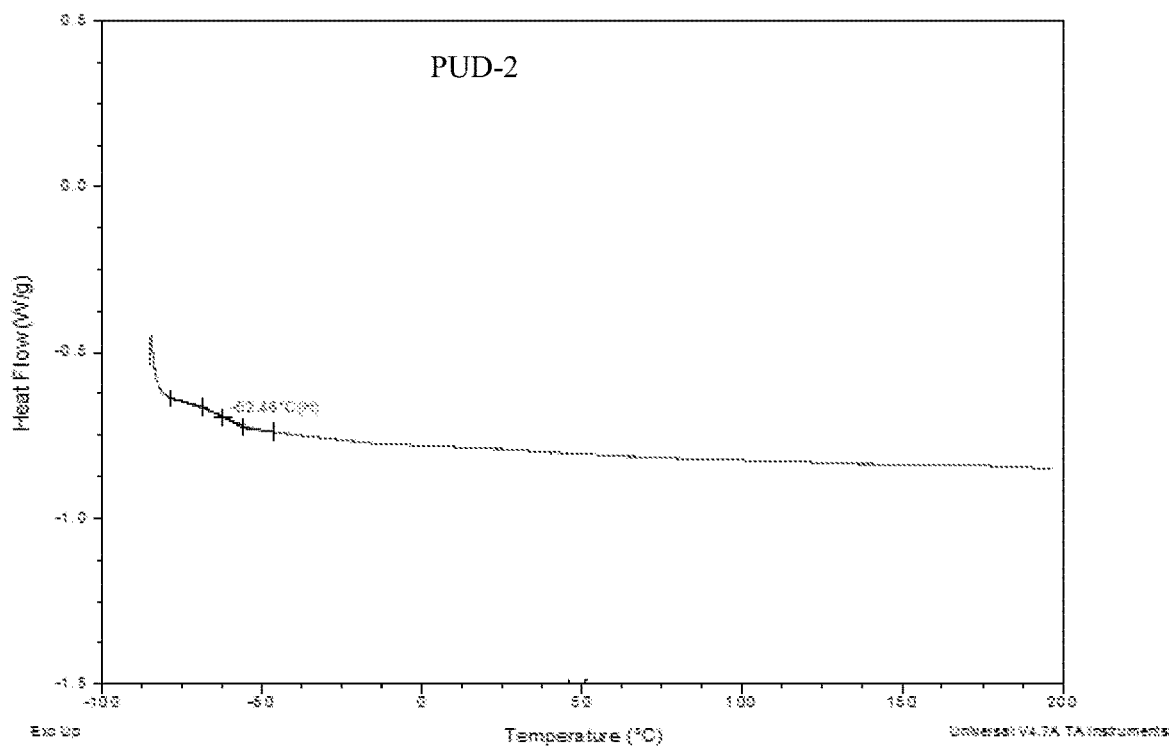
FIG. 3 is a differential scanning calorimetry curve for ROBOND™ L-168.
Figure 4:
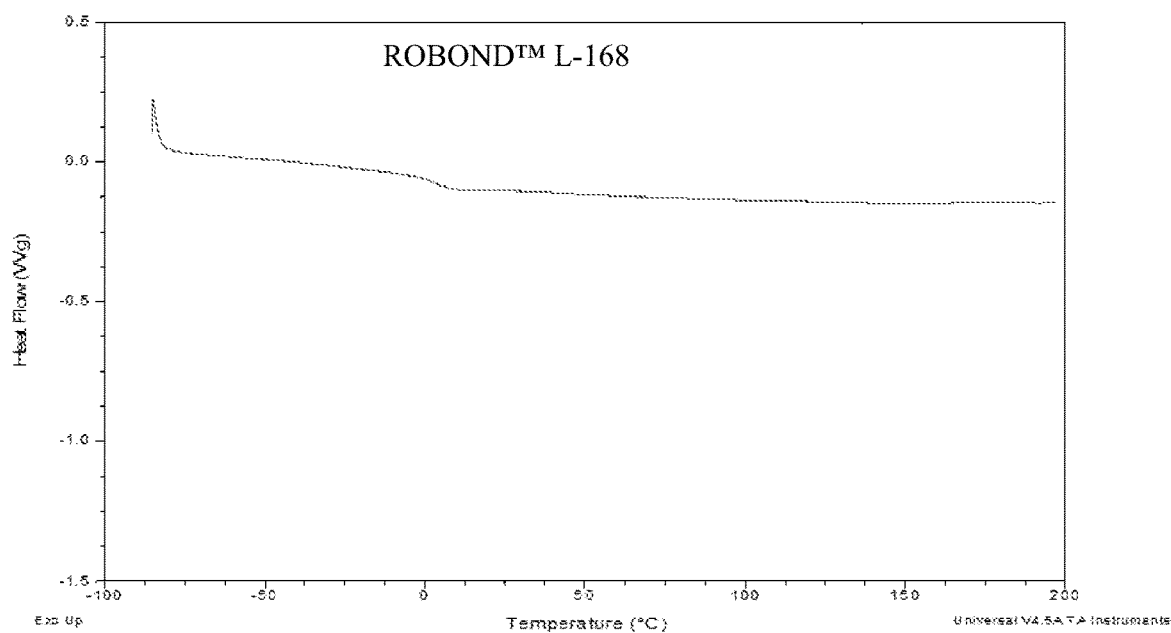
FIG. 4 is a differential scanning calorimetry curve for PUD-2.

As illustrated in Table 2, Illustrative Examples IE1 and IE2 (aqueous polyurethane dispersion compositions having crystalline behavior), exhibited improved OTR barrier performance and comparable WVTR and bond strength compared with CE 1 and CE2 (non-crystalline polymer backbones). The crystalline behavior of IE1 and IE2 is demonstrated by DSC analyses in FIGS. 1 through 4 in which adhesives applied in IE1 and IE2 showed enthalpies of fusion of crystalline with melting points around 45° C., while no such peaks are exhibited for adhesives applied in CE1 and CE2.

In addition to the embodiments described above and those set forth in the Examples, many examples of specific combinations are within the scope of the disclosure, some of which are described below:

Example 1

An aqueous polyurethane dispersion composition, comprising:
   a polyurethane prepolymer dispersed in an aqueous medium, the polyurethane prepolymer comprising:
       an isocyanate; and
       a crystalline polyester polyol having a hydroxyl content of 20 to 150 mg KOH/g and a melt temperature of less than or equal to 90° C.

Example 2

The aqueous polyurethane dispersion composition according to any preceding or succeeding Example, wherein the isocyanate is selected from the group consisting of an aromatic isocyanate, an aliphatic isocyanate, a cycloaliphatic isocyanate, and combinations of two or more thereof.

Example 3

The aqueous polyurethane dispersion composition according to any preceding or succeeding Example, wherein the crystalline polyester polyol is a polycondensate of a linear diol and a linear carboxylic acid.

Example 4

The aqueous polyurethane dispersion composition according to any preceding or succeeding Example, wherein the linear diol is selected from the group consisting of butanediol, hexanediol, and combinations thereof.

Example 5

The aqueous polyurethane dispersion composition according to any preceding or succeeding Example, wherein the linear dicarboxylic acid is adipic acid.

Example 6

The aqueous polyurethane dispersion composition according to any preceding or succeeding Example, wherein the crystalline polyester polyol is a polycaprolactone polyol.

Example 7

The aqueous polyurethane dispersion composition according to any preceding or succeeding Example, further comprising a surfactant.

Example 8

The aqueous polyurethane dispersion composition according to any preceding or succeeding Example, further comprising a polyamine.

Example 9

A method for laminating a first substrate to a second substrate, comprising:
provingding an aqueous polyurethane dispersion by dispersing a polyurethane prepolymer in an aqueous medium, the polyurethane prepolymer comprising:
an isocyanate; and
a crystalline polyester polyol having a hydroxyl content of 20 to 150 mg KOH/g and a melt temperature of less than or equal to 90° C.;
applying the aqueous polyurethane dispersion composition to a surface of the first substrate;
bringing the side of the first substrate into contract with a surface of the second substrate; and
curing the aqueous polyurethane dispersion composition, thereby laminating the first substrate to the second substrate.

Example 10

A laminate formed according to any preceding or succeeding Example.

As described above, in various embodiments of the disclosure, any element of any of Examples 1 through 10 can be combined with any element of any other of Examples 1 through 10.

The invention claimed is:

1. An aqueous polyurethane dispersion composition, comprising:
a polyurethane prepolymer dispersed in an aqueous medium, which is a continuous fluid medium containing water in the amount, by weight based on the weight of the continuous fluid medium, of 50% or higher; and polyamine;
wherein the polyurethane prepolymer comprises:
an aromatic isocyanate; and
a crystalline polycaprolactone polyol having a hydroxyl content of 20 to 150 mg KOH/g and a melt temperature of 30° C. to 90° C., wherein the total amount of the crystalline polycaprolactone polyol is, by weight based on the total weight of the polyurethane prepolymer, from 50 to 80 wt %.

2. The aqueous polyurethane dispersion composition of claim 1, further comprising a surfactant.

3. The aqueous polyurethane dispersion composition of claim 1, further comprising a polyamine.

4. A method for laminating a first substrate to a second substrate, comprising:
providing an aqueous polyurethane dispersion by dispersing a polyurethane prepolymer in an aqueous medium which is a continuous fluid medium containing water in the amount, by weight based on the weight of the continuous fluid medium, of 50% or higher; and
polyamine;
the polyurethane prepolymer comprising:
an aromatic isocyanate; and
a crystalline polycaprolactone polyol having a hydroxyl content of 20 to 150 mg KOH/g and a melt temperature of 30° C. to 90° C., wherein the total amount of the crystalline polycaprolactone polyol is, by weight based on the total weight of the polyurethane prepolymer, from 50 to 80 wt %;
applying the aqueous polyurethane dispersion composition to a surface of the first substrate;
bringing the side of the first substrate into contract with a surface of the second substrate; and
curing the aqueous polyurethane dispersion composition, thereby laminating the first substrate to the second substrate.

5. A laminate formed according to the method of claim 4.

* * * * *